(12) United States Patent
Kyle et al.

(10) Patent No.: US 11,940,283 B2
(45) Date of Patent: Mar. 26, 2024

(54) VEHICLE MATCHING SYSTEMS AND METHODS FOR MATCHING A USER WITH A VEHICLE

(71) Applicant: Toyota Motor North America, Inc., Plano, TX (US)

(72) Inventors: Roger A. Kyle, Frisco, TX (US);
Christopher Risberg, Flower Mound, TX (US); Nikhil Rajendra, Plano, TX (US); Timothy Wang, Frisco, TX (US); Jordan Frank, Farmers Branch, TX (US); Jiju Thomas, Allen, TX (US); Daniel C. Bracken, Frisco, TX (US); Joshua Batie, Frisco, TX (US); Michael D. Dorazio, Santa Monica, CA (US); Randy Kaushek, Rancho Santa Margarita, CA (US)

(73) Assignee: Toyota Motor North America, Inc., Plano, TX (US)

( * ) Notice: Subject to any disclaimer, the term of this patent is extended or adjusted under 35 U.S.C. 154(b) by 232 days.

(21) Appl. No.: 17/400,370

(22) Filed: Aug. 12, 2021

(65) Prior Publication Data
US 2023/0049632 A1 Feb. 16, 2023

(51) Int. Cl.
*G01C 21/34* (2006.01)

(52) U.S. Cl.
CPC ..... *G01C 21/3438* (2013.01); *G01C 21/3461* (2013.01); *G01C 21/3484* (2013.01); *G01C 21/3492* (2013.01)

(58) Field of Classification Search
CPC ............ G01C 21/3438; G01C 21/3484; G01C 21/3492
See application file for complete search history.

(56) References Cited

U.S. PATENT DOCUMENTS

| 8,725,311 | B1 | 5/2014 | Breed et al. |
| 10,152,053 | B1 * | 12/2018 | Smith .................... G06Q 10/02 |
| 10,308,257 | B2 | 6/2019 | Kundu |
| 10,532,658 | B2 | 1/2020 | Kim et al. |
| 10,593,213 | B1 * | 3/2020 | Copeland ............ H04L 63/0861 |
| 10,703,204 | B2 | 7/2020 | Hassan et al. |

(Continued)

FOREIGN PATENT DOCUMENTS

| CN | 104613549 A | 7/2017 |
| CN | 108109041 A | 6/2018 |

(Continued)

*Primary Examiner* — Anne Marie Antonucci
*Assistant Examiner* — Patrick M Brady
(74) *Attorney, Agent, or Firm* — Dinsmore & Shohl LLP

(57) ABSTRACT

A method for matching a vehicle with a user including receiving a user ride request for a vehicle from a plurality of available vehicles from a user, receiving a threshold vehicle risk score preference for the user, receiving a user risk score for the user, receiving a threshold user risk score preference for the plurality of available vehicles, identifying a subset of the plurality of available vehicles having a vehicle risk score at or below the threshold vehicle risk score preference of the user and a threshold user risk score preference at or above the user risk score of the user, and presenting the user with ride options for selecting one of the subset of the plurality of available vehicles of the subset of available vehicles for the user ride request.

20 Claims, 6 Drawing Sheets

(56) References Cited

U.S. PATENT DOCUMENTS

| | | |
|---|---|---|
| 2010/0280854 A1 | 11/2010 | Huang et al. |
| 2018/0225421 A1 | 8/2018 | Balasubramanian et al. |
| 2018/0268473 A1 | 9/2018 | Um et al. |
| 2018/0276485 A1* | 9/2018 | Heck .................... G06N 7/01 |
| 2019/0130663 A1* | 5/2019 | Li .......................... G08G 1/01 |
| 2019/0168711 A1* | 6/2019 | Oesterling ............ B60R 25/305 |
| 2019/0361437 A1 | 11/2019 | Wilson et al. |
| 2021/0056477 A1* | 2/2021 | Ahire ................ G06Q 10/0635 |
| 2022/0138886 A1* | 5/2022 | Rakshit ............. G06Q 30/0203 |
| | | 705/7.32 |

FOREIGN PATENT DOCUMENTS

| | | |
|---|---|---|
| CN | 108583580 A | 9/2018 |
| CN | 110619446 A | 12/2019 |
| CN | 111202861 A | 5/2020 |
| CN | 111885502 A | 11/2020 |
| DE | 102011016777 A1 | 10/2012 |
| KR | 20100053264 A | 5/2010 |
| KR | 20170011703 A | 2/2017 |
| KR | 101982594 B1 | 5/2019 |
| KR | 20200003763 A | 1/2020 |
| KR | 102073561 B | 3/2020 |
| WO | 2020102372 A1 | 5/2020 |

* cited by examiner

VEHICLE MATCHING SYSTEMS AND METHODS FOR MATCHING A USER WITH A VEHICLE

TECHNICAL FIELD

The present specification generally relates to vehicle systems for matching a user to a vehicle and, more specifically, ride sharing vehicle systems in which a user is matched to a particular vehicle based on a risk score of the user and a risk score of the vehicle.

BACKGROUND

Ride sharing services have become widely available and utilized to pick up a user from a particular destination and transport the user to an intended destination. Current ride sharing services may assign both drivers and users, i.e., passengers, with a score. In some instances, drivers may decline requests from a user based on a low score of the user. The low score may be indicative of poor previous experiences with other drivers. Similarly, the user may have the opportunity to decline an offered ride from a particular driver based on a low score assigned to the driver. However, these scores are not based on one or more factors associated with a potential health risk of the driver and the user. Additionally, although the driver and the user may have the opportunity to decline offered rides or passengers, current ride sharing services do not match users and drivers based on these scores.

Accordingly, a need exists for improved systems and methods for matching vehicles and users with one another based one risk scores associated with both the user and the vehicle.

SUMMARY

In one embodiment, a method for matching a vehicle with a user, includes receiving, by a computing device, a user ride request for a vehicle from a plurality of available vehicles from a user, receiving, by the computing device, a threshold vehicle risk score preference for the user, determining, by the computing device, a user risk score for the user, determining, by the computing device, a vehicle risk score for at least one of the plurality of available vehicles, receiving, by the computing device, a threshold user risk score preference for the plurality of available vehicles, identifying, by the computing device, a subset of the plurality of available vehicles having a vehicle risk score at or below the threshold vehicle risk score preference of the user and a threshold user risk score preference at or above the user risk score of the user, and presenting the user with ride options for selecting one of the subset of the plurality of available vehicles of the subset of available vehicles for the user ride request.

In another embodiment, a vehicle matching system includes a computing device comprising a controller configured to receive a user ride request for a vehicle from a plurality of available vehicles from a user, receive a threshold vehicle risk score preference for the user, determine a user risk score for the user, determine a vehicle risk score for the plurality of available vehicles, receive a threshold user risk score preference for the plurality of available vehicles, identify a subset of the plurality of available vehicles having a vehicle risk score at or below the threshold vehicle risk score preference of the user and a threshold user risk score preference at or above the user risk score of the user, and present the user with options for selecting one of the subset of the plurality of available vehicles of the subset of available vehicles for the user ride request.

In another embodiment, a vehicle matching system includes a computing device comprising a controller configured to receive a user ride request for a vehicle from a plurality of available vehicles from a user, identify one or more vehicles within a subset of the plurality of available vehicles having a vehicle risk score at or below a threshold vehicle risk score preference of the user and a threshold user risk score preference at or above a user risk score of the user, and present the user with one or more ride options for selecting one of the one or more vehicles of the subset of the plurality of available vehicles for the user ride request.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
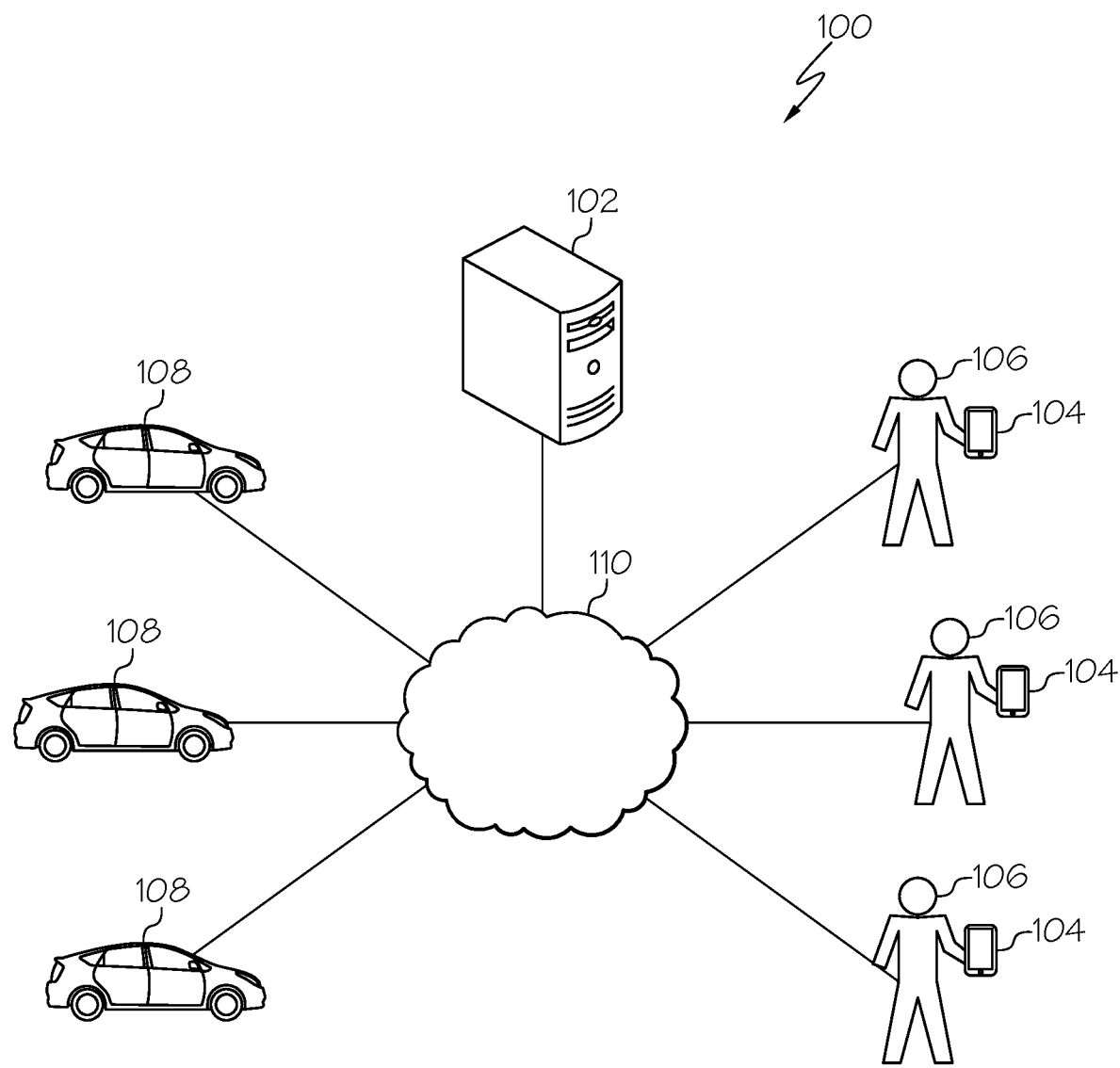
FIG. 1 schematically depicts a vehicle matching system including a server communicating with a plurality of user devices and a plurality of vehicles, according to one or more embodiments shown and described herein.

Embodiments described herein are directed to systems and methods for matching users with available vehicles based on risk scores associated with the users and the vehicles. The vehicle matching system includes a server including a controller configured to receive a user ride request for a vehicle from a plurality of available vehicles from a user, identify a subset of the plurality of available vehicles having a vehicle risk score at or below a threshold vehicle risk score preference of the user and a threshold user risk score preference at or above a user risk score of the user, and present the user with options for selecting one of the subset of the plurality of available vehicles of the subset of available vehicles for the user ride request. Various embodiments of the systems and methods and the operation of the system are described in more detail herein. Whenever possible, the same reference numerals will be used throughout the drawings to refer to the same or like parts.

Referring now to FIG. 1, a vehicle matching system 100 is illustrated according to one or more embodiments described herein. The present vehicle matching system 100 is particularly useful with ride sharing applications in which a user sends, via a user device, a signal including a user ride request requesting to be picked up at a particular location and driven to a destination. The vehicle matching system 100 includes a remote computing device 102 in communication with a plurality of user devices 104, operated by respective users 106, and a plurality of vehicles 108 via a network 110. The network 110 can be configured as the internet, mobile communication network, satellite-based network, LAN connection, Wi-Fi connection, etc. The remote computing device 102 may be configured as any computing device for performing the functionality described herein, such as a server, personal computer, tablet, mobile computing device, etc. The user devices 104 may be any personal computing device, mobile computing device, mobile phone, etc. The user devices 104 are pre-registered with the remote computing device 102. The user devices 104 may be associated with respective user profiles stored in the remote computing device 102. Similarly, the vehicles 108 may be pre-registered with the remote computing device 102 and associated with a vehicle profile stored in the remote computing device 102. As described in more detail herein, the user profiles and the vehicle profiles may include associated risk scores and associated threshold risk score preferences. Specifically, a user profile may include user data that includes a user risk score and a threshold vehicle risk score preference. Similarly, a vehicle profile may include vehicle data that includes a vehicle risk score and a threshold user risk score preference. The various risk scores and threshold risk score preferences may be utilized by the remote computing device 102 to match a user device 104, specifically a user 106 in possession of the user device 104, with one of the plurality of vehicles 108 in the manner discussed herein.

Figure 2:
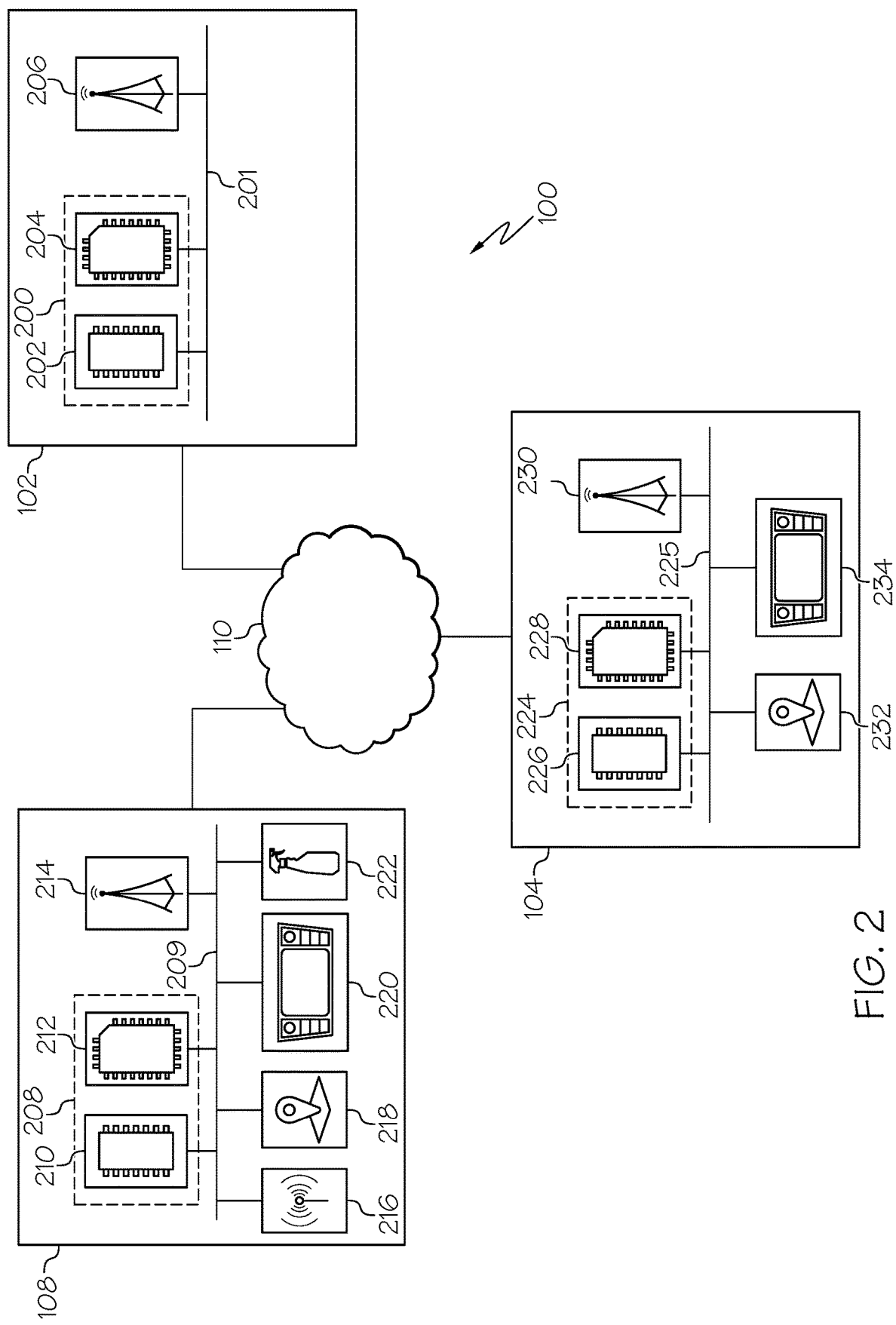
FIG. 2 schematically depicts individual components of the server, a vehicle, and a user device of the vehicle matching system of FIG. 1, according to one or more embodiments shown and described herein.

Referring now to FIG. 2, a schematic diagram of an embodiment of the vehicle matching system 100 is depicted including one of the user devices 104, one of the vehicles 108, and the network 110, according to one or more embodiments shown and described herein. It should be appreciated that while only one user device 104 and one vehicle 108 are illustrated in FIG. 2, the vehicle matching system 100 may include any number of user devices 104 and vehicles 108 based on the number of user devices 104 and vehicles 108 present.

In embodiments, the remote computing device 102 includes a controller 200, a communication path 201, and network interface hardware 206. The various components of the remote computing device 102 and the interaction thereof will be described in detail below. It should be noted that some embodiments of the remote computing device 102 may include additional components not described herein.

The communication path 201 may be formed from any medium that is capable of transmitting a signal such as, for example, conductive wires, conductive traces, optical waveguides, or the like. Moreover, the communication path 201 may be formed from a combination of mediums capable of transmitting signals. In one embodiment, the communication path 201 includes a combination of conductive traces, conductive wires, connectors, and buses that cooperate to permit the transmission of electrical data signals to components such as processors, memories, sensors, input devices, output devices, and communication devices. Accordingly, the communication path 201 may include a bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The communication path 201 communicatively couples the various components of the server. As used herein, the term "communicatively coupled" means that coupled components are capable of exchanging data signals with one another such as, for example, electrical signals via conductive medium, electromagnetic signals via air, optical signals via optical waveguides, and the like.

As noted above, the remote computing device 102 includes the controller 200 including the one or more processors 202 and one or more memory components 204. Each of the one or more processors 202 may be any device capable of executing machine readable instructions. Accordingly, each of the one or more processors 202 may be an integrated circuit, a microchip, a computer, or any other computing device. The one or more processors 202 are communicatively coupled to the other components of the remote computing device 102 by the communication path 201. Accordingly, the communication path 201 may communicatively couple any number of processors with one another, and allow the modules coupled to the communication path 201 to operate in a distributed computing environment. Specifically, each of the modules may operate as a node that may send and/or receive data.

Each of the one or more memory components 204 of the remote computing device 102 is coupled to the communication path 201 and communicatively coupled to the one or more processors 202. The one or more memory components 204 may include RAM, ROM, flash memories, hard drives, and/or any other hardware or firmware capable of storing machine readable instructions such that the machine readable instructions may be accessed and executed by the one or more processors 202. The machine readable instructions may include logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable instructions and stored on the one or more memory components. In some embodiments, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

Figure 3:
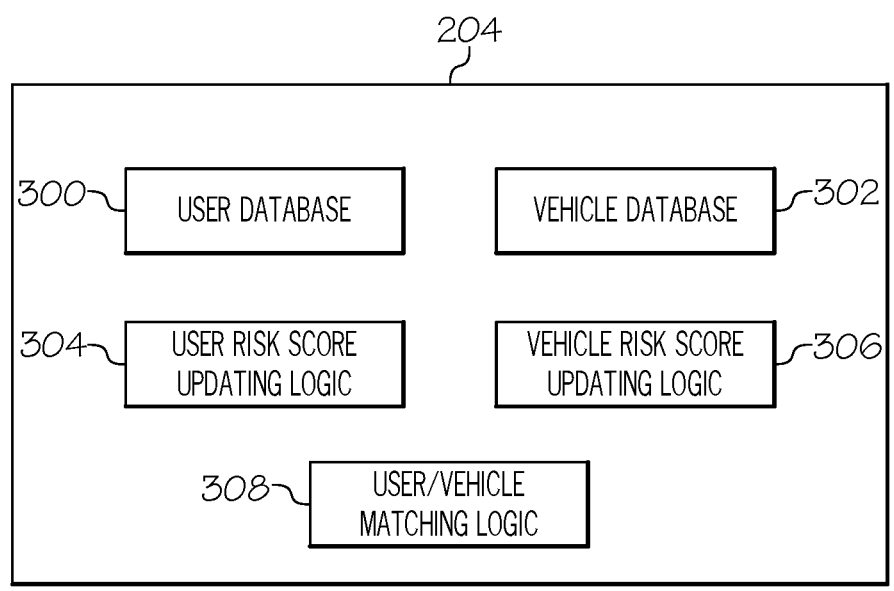
FIG. 3 schematically depicts a memory component of the server, according to one or more embodiments shown and described herein.

Referring now to FIG. 3, an embodiment of the one or more memory components 204 is depicted including a user database 300, a vehicle database 302, user risk score updating logic 304, vehicle risk score updating logic 306, and user/vehicle matching logic 308. The user database 300 includes a listing of all user devices 104 registered with the vehicle matching system 100. Specifically, the user database 300 includes data collected from the user devices 104 such as, location information, previous ride history, and the like. The user database 300 also includes a user risk score and threshold vehicle risk score preference associated with each user device 104. Similarly, the vehicle database 302 includes data collected from the vehicles 108 such as, location information, previous ride history, previous passenger history, previous cleaning history, and the like. The vehicle database 302 also includes a vehicle risk score and threshold user risk score preference associated with each vehicle 108.

The user risk score updating logic 304 causes the remote computing device 102 to adjust the user risk score of one or more of the user devices 104 stored within the user database 300. Specifically, the user risk score updating logic 304 causes the remote computing device 102 to analyze the data received from the user devices 104 to determine how the user risk score of each user device 104 should be adjusted. Similarly, the vehicle risk score updating logic 306 causes the remote computing device 102 to adjust the vehicle risk score of vehicles 108 stored within the vehicle database 302. Specifically, the vehicle risk score updating logic 306 may cause the remote computing device 102 to analyze the data received from the vehicles 108 to determine how the vehicle risk score of each vehicle 108 should be adjusted. The user/vehicle matching logic 308 causes the remote computing device 102 to analyze the user risk score and the threshold vehicle risk score preference of a user device 104 transmitting a user ride request, to match the user device 104 with an available vehicle 108 based on the vehicle risk score and the threshold user risk score preference of the available vehicles 108. In some embodiments, the user/vehicle matching logic 308 will match the user device 104 transmitting the user ride request with a plurality of vehicles 108 to present the user 106 of the user device 104 with one or more ride options for selecting a specific one of the vehicles 108.

Referring again to FIG. 2, the vehicle 108 includes a controller 208, including one or more processors 210 and one or more memory components 212, a communication path 209, network interface hardware 214, one or more interior sensors 216, a location sensor 218, a user interface 220, and a cleaning device 222. The various components of the vehicle 108 and the interaction thereof will be described in detail below. However, it should be noted that, in embodiments, the vehicle 108 may include fewer components than those discussed herein or additional components not discussed herein.

The components of the vehicle 108 may be structurally similar to and have similar functions as the corresponding components of the remote computing device 102 (e.g., the controller 208 corresponds to the controller 200, the communication path 209 corresponds to the communication path 201, and the network interface hardware 214 corresponds to the network interface hardware 206).

The one or more interior sensors 216 are coupled to the communication path 209 and communicatively coupled to the one or more processors 210. The one or more interior sensors 216 may include a temperature sensor, an audio detection sensor, and the like. In embodiments in which the one or more interior sensors 216 include a temperature sensor, the temperature of a passenger in the vehicle 108 may be detected. The temperature sensor may be a handheld temperature sensor, such as an infrared thermometer, for taking a temperature reading of a passenger in the vehicle 108. As such, it may be determined either by the temperature sensor itself or by processing at the controller 208 of temperature readings detected by the temperature sensor that a passenger of the vehicle 108 has a temperature above a predetermined temperature. As described herein, the temperature of the passenger detected by the temperature sensor may be utilized for adjusting the vehicle risk score of the vehicle 108.

In embodiments, the one or more interior sensors 216 may include an audio detection sensor for detecting and identifying or classifying specific noises within the vehicle 108. In embodiments, the audio detection sensor includes a microphone for detecting noise levels within the vehicle 108, and a noise analyzer for identifying or classifying the type of noise detected by the microphone. In some embodiments, the audio detection sensor may transmit a signal including audio data pertaining to the detected noise to the controller 208 to analyze the detected noise and identify the type of noise. Specifically, the detected noise may be identified or classified as, for example, a cough, a sneeze, vomiting, or the like. As described herein, the noise detected within the vehicle 108 by the audio detection sensor may be utilized for adjusting the vehicle risk score of the vehicle 108.

As noted above, the vehicle 108 includes a location sensor 218 coupled to the communication path 209 and communicatively coupled to the one or more processors 210. The location sensor 218 may be a satellite-based radio navigation device, such as a GPS device, for tracking driving behavior of the vehicle 108 such as, for example, a location of the vehicle 108, distance the vehicle 108 has traveled, and the like. More particularly, the location sensor 218 may track the location of the vehicle 108 to determine when the vehicle 108 enters a geographic region determined to be a high-risk area, such as an area having a population density in excess of a predetermined population density threshold, an area with an infection positivity rate above a predetermined threshold, an area that recently hosted a super spreader event, etc. Population density may be determined by dividing the size of the geographic area by the population within the geographic area. If the population density is above the predetermined population density threshold, it may be determined that the geographic area is a high-risk area. Further, for example, the geographic area may be determined to be a high-risk area if the size of the geographic area divided by the infection positivity rate, i.e., the number of confirmed new cases of a disease, illness, or symptoms, is above a predetermined threshold, which indicates a greater likelihood of being exposed to the disease, illness, or symptoms within the geographic area. In addition, the location sensor 218 may determine how long the vehicle 108 is within the geographic region. In embodiments, the geographic region may be determined to be a high-risk area based on data collected from a remote system in communication with the remote computing device 102 and/or the vehicle 108. Thus, the remote system may provide a map in which a plurality of geographic regions are indicated as being a high-risk area and the location sensor 218 of the vehicle 108 detects when the vehicle 108 enters one of the geographic regions based on a location of the vehicle 108 and a known location of the high-risk geographic regions. As described herein, the location of the vehicle 108 entering a geographic area determined to be a high-risk area, as well as the duration or length of time the vehicle 108 is within the particular geographic area, may be utilized for adjusting the vehicle risk score of the vehicle 108.

As noted above, the vehicle 108 includes the user interface 220 for providing visual output such as, for example, notifications, entertainment, maps, navigation, information, or a combination thereof. The user interface 220 is coupled to the communication path 209 and communicatively coupled to the one or more processors 210. The user interface 220 may include any medium capable of transmitting an optical output such as, for example, a cathode ray tube, light emitting diodes, a liquid crystal display, a plasma display, projection display, holographic display, augmented display, or the like. Moreover, the user interface 220 may include a tactile operating device capable of transforming mechanical, optical, or electrical signals into a data signal capable of being transmitted with the communication path 209. Specifically, the tactile operating device may include any number of movable objects that each transform physical motion into a data signal that may be transmitted to over the communication path 209 such as, for example, a button, a switch, a knob, or the like. In embodiments, tactile operating device may be a touchscreen that, in addition to providing optical information, detects the presence and location of a tactile input. The user interface 220 may request input from a person within the vehicle 108 such as, for example, a driver or operator of the vehicle 108, or a passenger of the vehicle 108. For example, the user interface 220 may inquire as to whether a cleaning event of the vehicle 108 has occurred, when the last cleaning event of the vehicle 108 has occurred, where the vehicle 108 has driven, how long the vehicle 108 has been driven, how many passengers the vehicle 108 has driven, and the like. As described in more detail herein, the input received at the user interface 220 in response to the inquiries may be utilized for adjusting the vehicle risk score of the vehicle 108.

As noted above, the vehicle 108 includes the cleaning device 222 for cleaning or sanitizing the vehicle 108 such as, for example, surfaces of seats in the vehicle 108 and the like. The cleaning device 222 is coupled to the communication path 209 and communicatively coupled to the one or more processors 210. The cleaning device 222 may include any known or yet-to-be developed device for cleaning and/or sanitizing at least portions of the vehicle 108. For example, the cleaning device 222 may include one or more of a drying device, such as an ultraviolet or high temperature heat lamp, a sanitizing spray nozzle for emitting a solution, an ozone emitter, a vacuum, and the like. The cleaning device 222 may be manually operated by a driver or operator of the vehicle 108 and/or may be automatically operated in response to one or more cleaning triggers such as, for example, after a predetermined period of time, after a predetermined number of passengers have been transported, after a predetermined distance been traveled, or the like. Upon activation of the cleaning device 222, either in response to manual operation of the cleaning device 222 or a cleaning trigger, a time is recorded at which the cleaning device 222 was activated, i.e., a cleaning event. As described in more detail herein, an elapsed time since a cleaning event has occurred may be utilized for adjusting the vehicle risk score of the vehicle 108. In embodiments, the operator of the vehicle 108 may manually indicate, via the user interface 220, that a cleaning event has occurred.

Referring still to FIG. 2, the user device 104 includes a controller 224, including one or more processors 226 and one or more memory components 228, a communication path 225, network interface hardware 230, a location sensor 232, and a user interface 234. The various components of the user device 104 and the interaction thereof will be described in detail below. However, it should be noted that, in embodiments, the user device 104 may include fewer components than those discussed herein or additional components not discussed herein.

The components of the user device 104 may be structurally similar to and have similar functions as the corresponding components of the vehicle 108 (e.g., the controller 224 corresponds to the controller 208, the communication path 225 corresponds to the communication path 209, the network interface hardware 230 corresponds to the network interface hardware 214, the location sensor 232 corresponds to the location sensor 218, and the user interface 234 corresponds to the user interface 220).

Similar to the location sensor 218 of the vehicle 108, the location sensor 232 of the user device 104 is coupled to the communication path 225 and communicatively coupled to the one or more processors 226. The location sensor 232 may track the location of the user device 104 to determine when the user 106 enters a geographic region determined to be a high-risk area, i.e., an area having a population density in excess of a predetermined population density threshold. The location sensor 232 of the user device 104 detects when the user device 104 enters one of the geographic regions based on a location of the user device 104 and a known location of the high-risk geographic regions, as well as when the user device 104 exits the geographic region. Accordingly, the location sensor 232 may determine a how long the user device 104 is within the geographic region. It should be appreciated that high-risk areas for the user device 104 may be the same or differ from those high-risk areas discussed above with respect to the vehicle 108. As described herein, the location of the user device 104 entering a geographic area determined to be a high-risk area, as well as the duration or length of time the user device 104 is within the particular geographic area, may be utilized for adjusting the user risk score of the user 106.

Similar to the user interface 220 of the vehicle 108, the user interface 234 of the user device 104 is coupled to the communication path 225 and communicatively coupled to the one or more processors 226. The user interface 234 may request input from the user 106 of the user device 104. For example, the user interface 234 may inquire as to health data of the user 106, test results of the user 106, screening questions, vaccination statuses, previous contact or interactions with others, and the like to determine a potential risk that the user 106 may pose to others when in contact or close proximity. As described in more detail herein, the input received at the user interface 234 in response to the inquiries may be utilized for adjusting the user risk score of the user 106.

Figure 4:
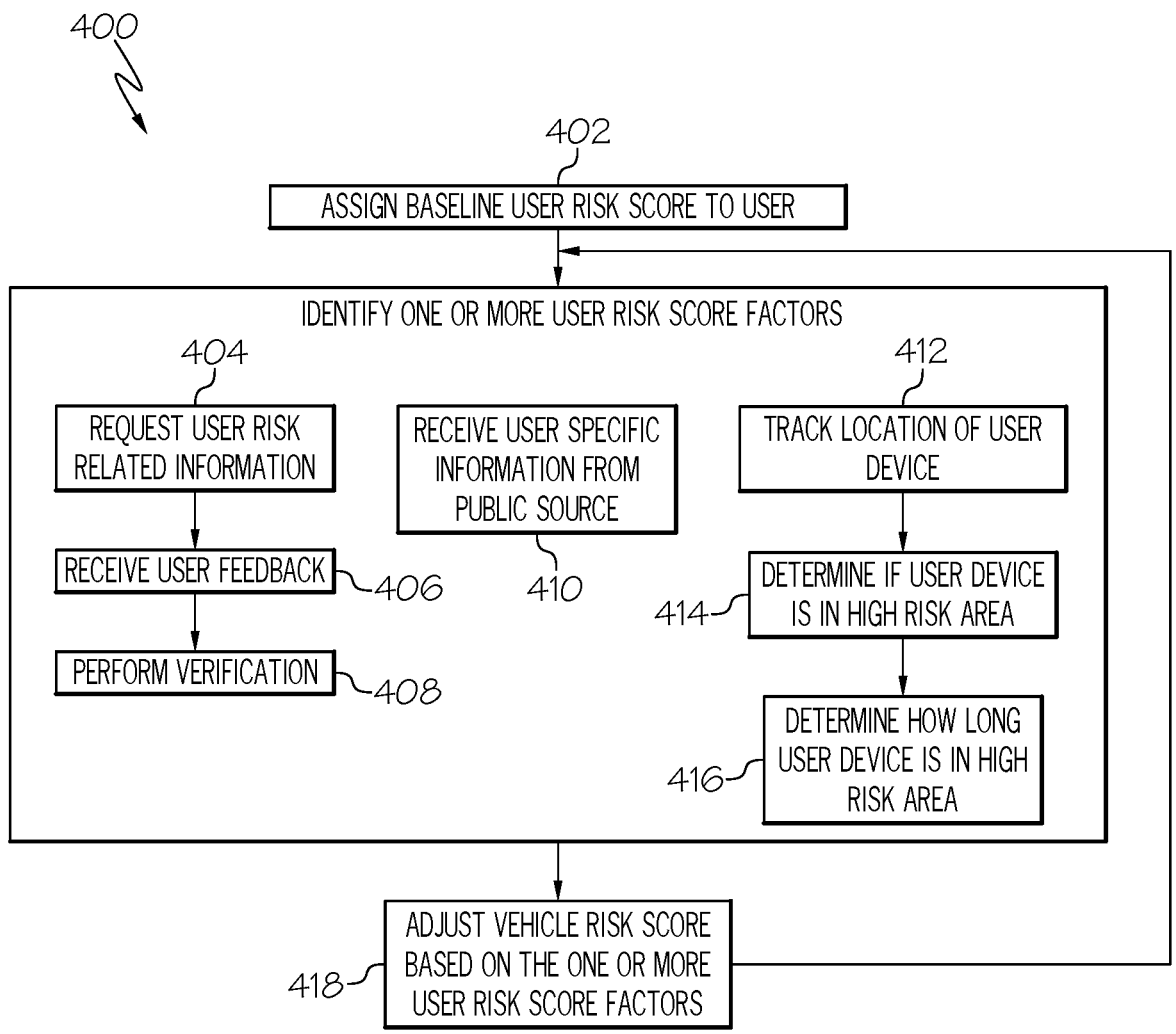
FIG. 4 schematically depicts a method for assigning a user risk score to a user, according to one or more embodiments shown and described herein.

Referring now to FIG. 4, a process 400 is depicted for adjusting a user risk score of a user based on one or more user risk score factors collected by monitoring user activity via a user device. The process 400 is discussed with reference to the vehicle matching system 100 and, particularly, the remote computing device 102 communicating with the user device 104 illustrated in FIG. 2 and the memory component 204 of the remote computing device 102 illustrated in FIG. 3.

At block 402, the remote computing device 102 assigns a baseline user risk score to each user 106 registered with the remote computing device 102. The baseline user risk score of a user 106 may be assigned during an initial registration process in which the user 106 is presented with a series of inquiries pertaining to previous activity of the user 106, and the current health of the user 106 including vaccination statuses, test results, and the like. This initial data may be collected by displaying inquiries on the user interface 234 of the user device 104 and receiving input from the user 106 via the user interface 234. Accordingly, the baseline user risk score is associated with the user 106 and stored within the user database 300 of the memory component 204 of the remote computing device 102. As a non-limiting example, the baseline user risk score may be determined by assigning one or more points to each inquiry presented to the user. For each inquiry in which a response is provided that is determined to present a risk, one or more points are added, based on the assigned level of risk to the response, to determine the baseline user risk score.

Thereafter, one or more user risk score factors are identified, which are utilized to adjust the user risk score, as discussed in more detail herein. Thus, the user risk score may be adjusted on a continuous basis to provide an adjusted user risk score for the user 106 based on activity of the user 106. In embodiments, the one or more user risk score factors may be based on updated health data or risk data collected from the user 106 via the user device 104. Similar to the manner in which the baseline user risk score is determined, one or more points may be assigned to the user risk score factors based on the data acquired and the one or more points are then applied to the baseline user risk score to provide an increased user risk score.

For example, at block 404, the remote computing device 102 sends a signal to the user device 104 requesting user risk related information. As noted above, the request may include inquiries as to health data of the user 106, test results of the user 106, screening questions, vaccination statuses, previous contact or interactions with others, and the like to determine a potential risk that the user 106 may pose to others when in contact or close proximity. At block 406, the user 106 operates the user interface 234 of the user device 104 to respond and provide feedback to the inquiries in any suitable manner such as, for example, selecting predetermined responses, inputting custom responses, submitting images, or the like. As a non-limiting example, a user may submit answers, and in some embodiments, include documentation for proof regarding test results or vaccination statuses. At block 408, the remote computing device 102 may perform a verification of the feedback received from the user 106 via the user device 104. The verification may include, for example, confirming feedback from the user 109 by verifying accuracy of documentation provided.

Another example in which health data or risk data may be collected from the user 106 for purposes of adjusting the user risk score is to receive user specific information from a publicly available source. For example, at block 410, the remote computing device 102 may request health data from a publicly available health database such as a state, county, or other public health department that collects health data on registered participants. By identifying the user 106 among those participants in a publicly available health database, the remote computing device 102 can collect health data pertaining to that user 106.

Another example in which health data or risk data may be collected is by tracking a location of the user device 104 to determine if the user 106 has entered a high-risk area. As discussed above, the user device 104 includes the location sensor 232 for tracking a location of the user device 104. Thus, at block 412, the location of the user device 104 is monitored utilizing the location sensor 232 of the user device 104. At block 414, the remote computing device 102, or the user device 104 itself, determines whether the location of the user device 104, tracked by the location sensor 232, is within a geographic area determined to be a high-risk area. As discussed above, a geographic area may be determined to be a high-risk area based on a population density within that particular geographic area. A geographic area may also be determined to be a high-risk area based on health data relating to persons within that geographic area such as, for example, detected illnesses and the like. In embodiments, at block 416, the location sensor 232 of the user device 104 detects a duration or length of time for which the user 106 is within the high-risk area. Accordingly, the location sensor 232 may indicate a time at which the user 106 enters the high-risk area and a time at which the user 106 exits the high-risk area to determine the total length of time within the high-risk area.

At block 418, the remote computing device 102, particularly the user risk score updating logic 304, updates the user risk score stored within the user database 300 based on the one or more user risk score factors discussed herein. Specifically, the user risk score is updated by either increasing or decreasing the baseline user risk score in response to the one or more user risk score factors indicating an increased risk or a decreased risk, respectively. For example, if the user risk related information collected in blocks 404-408 indicate an increased risk, the user risk score updating logic 304 will increase the user risk score. In some embodiments, if the user risk related information collected in blocks 404-408 indicates no risk or a low risk, such as the user 106 has received all vaccinations, the user risk score updating logic 304 will decrease the user risk score. Similarly, the user risk score updating logic 304 may cause the remote computing device 102 to increase or decrease the user risk score based on the user specific information collected from the publicly available source in block 410. The user risk score updating logic 304 may also cause the also increase or decrease the user risk score based on whether or not the user device 104 entered a geographic area determined to be a high-risk area, as well as increase the user risk score proportional to the length of time that the user device 104 is within the particular geographic area. Once the user risk score is adjusted at block 418, the adjusted user risk score is stored within the user database. Blocks 404-416 may repeat at any given time to update the user risk score based on updated information collected from the user device 104.

Figure 5:
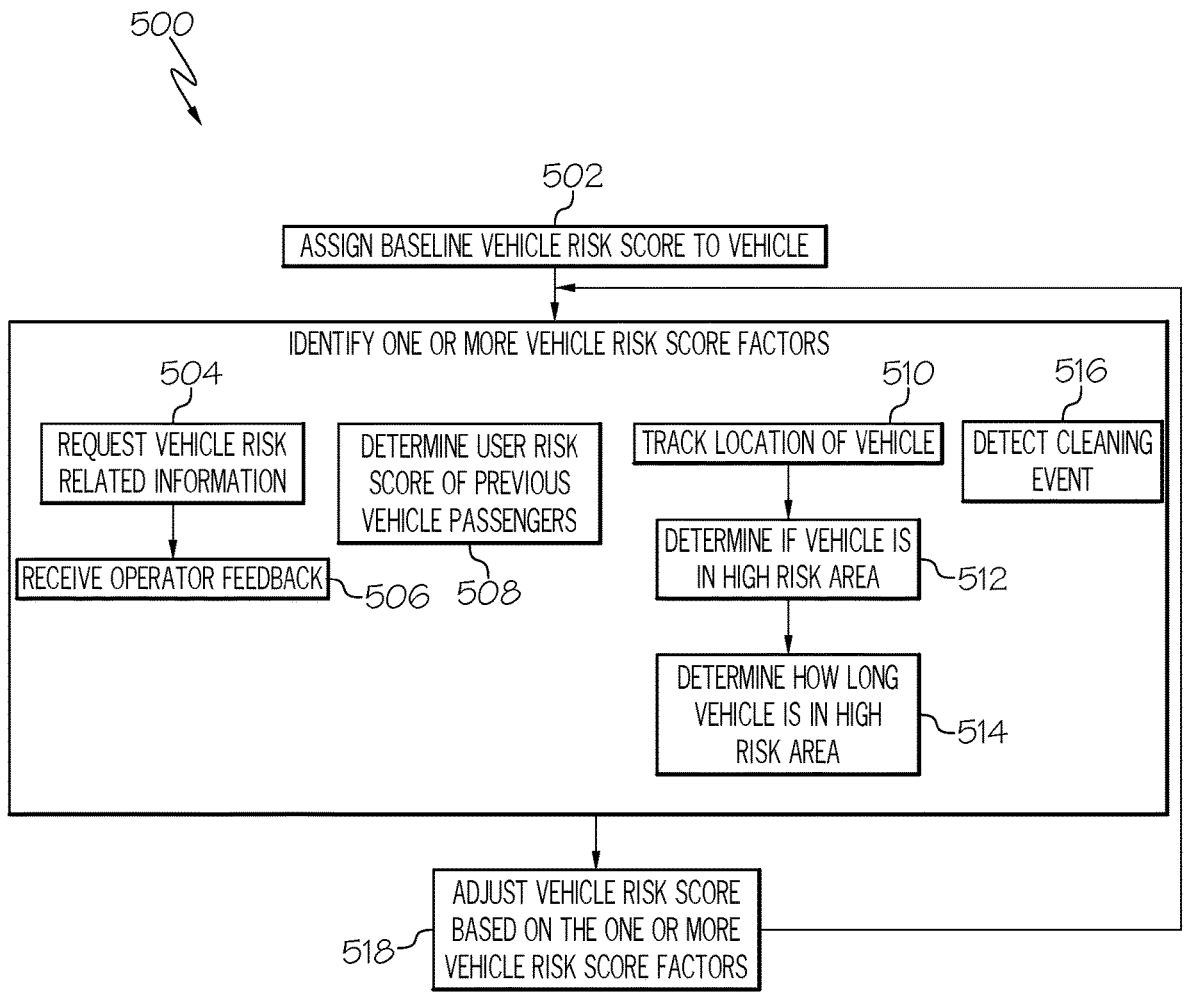
FIG. 5 schematically depicts a method for assigning a vehicle risk score to a vehicle, according to one or more embodiments shown and described herein.

Referring now to FIG. 5, a process 500 is depicted for adjusting a vehicle risk score of a vehicle 108 based on one or more vehicle risk score factors collected by monitoring activity of the vehicle 108. The process 500 is discussed with reference to the vehicle matching system 100 and, particularly, the remote computing device 102 communicating with the vehicle 108 illustrated in FIG. 2 and the memory component 204 of the remote computing device 102 illustrated in FIG. 3.

At block 502, the remote computing device 102 assigns a baseline vehicle risk score to the vehicle 108 previously registered with the remote computing device 102. As discussed above, the baseline vehicle risk score may be assigned during an initial registration process in which an operator of the vehicle 108 is presented with a series of inquires pertaining to previous activity of the vehicle 108 such as, for example, when a last cleaning event occurred. This initial data may be collected by displaying inquiries on the user interface 220 of the vehicle 108 and receiving input from the operator of the vehicle 108 via the user interface 220 and assigning point values to the input from the operator. Accordingly, the baseline vehicle risk score is associated with the vehicle 108 and stored within the vehicle database 302 of the memory component 204 of the remote computing device 102.

Thereafter, one or more vehicle risk score factors are identified, which are utilized to adjust the vehicle risk score, as discussed in more detail herein. Thus, the vehicle risk score may be adjusted on a continuous basis to provide an updated vehicle risk score for the vehicle 108. In embodiments, the one or more vehicle risk score factors may be based on activity of the vehicle 108.

For example, at block 504, the remote computing device 102 sends a signal to the vehicle 108 requesting vehicle risk related information. As noted above, the request may include inquiries as to health data of an operator of the vehicle 108 such as, for example, test results of the operator, screening questions, vaccination statuses, previous contact or interactions with others, and the like to determine a potential risk that the operator of the vehicle 108 may pose to others when in contact or close proximity. At block 506, the operator operates the user interface 220 of the vehicle 108 to respond and provide feedback to the inquiries in any suitable manner such as, for example, selecting predetermined responses, inputting custom responses, submitting images, or the like. Similar to block 408 discussed above, some embodiments may be configured such that verification may be provided such that the feedback received from the operator of the vehicle 108 may be verified. In embodiments, the vehicle risk related information may include a temperature reading or a noise detected by the one or more interior sensors 216 of the vehicle, as discussed herein, to determine whether a passenger, for example, as a temperature above a predetermined temperature threshold or has vomited in the vehicle 108.

Another example in which risk data may be collected is by identifying a user risk score of previous passengers of the vehicle 108. Thus, at block 508, the remote computing device 102 identifies which passengers have previously been driven by the vehicle 108 and, more particularly, identifies a user risk score of those passengers that are registered with the remote computing device 102 for which a user risk score has been assigned. As described in more detail herein, the user risk score of those passengers of the vehicle 108 may be utilized to adjust the vehicle risk score of the vehicle 108.

Another example in which risk data may be collected is by tracking a location of the vehicle to determine if the vehicle 108 enters a high-risk area. As discussed above, the vehicle 108 includes the location sensor 218 for tracking a location of the vehicle 108. Thus, at block 510, the location of the vehicle 108 is monitored utilizing the location sensor 218 of the vehicle 108. At block 512, the remote computing device 102, or the vehicle 108 itself, determines whether the location of the vehicle 108, tracked by the location sensor 218, enters a geographic area determined to be a high-risk area. The manner in which a geographic area may be determined to be a high-risk area may be the same as discussed above with respect to the high-risk geographic areas for the user device 104. Accordingly, the high-risk geographic areas may be the same or different than those geographic areas determined to be high-risk for the user device 104. In embodiments, at block 514, the location sensor 218 of the vehicle 108 detects a duration or length of time for which the vehicle 108 is within the high-risk area. Accordingly, the location sensor 218 may indicate a time at which the vehicle 108 enters the high-risk area and a time at which the vehicle 108 exits the high-risk area to determine the total length of time within the high-risk area.

Another example in which risk data may be collected is by determining whether a cleaning event has occurred. In embodiments, as discussed above, the vehicle 108 may be provided with the cleaning device 222 for sanitizing the vehicle 108. At block 516, the remote computing device 102 detects whether the cleaning device 222 has been activated, i.e., a triggering event has occurred, to clean the vehicle 108 and, thus, a cleaning event has occurred. In addition to detecting whether a cleaning event has occurred in the vehicle 108, the remote computing device 102 also determines an elapsed time since the cleaning event has occurred. It should be appreciated that the elapsed time since a cleaning event may be received by input from the operator of the vehicle 108 via the user interface 220 of the vehicle 108.

Lastly, at block 518, the remote computing device 102 via the vehicle risk score updating logic 306, updates the vehicle risk score stored within the vehicle database 302 based on the one or more vehicle risk score factors discussed herein. Specifically, the vehicle risk score may be updated by either increasing or decreasing the baseline vehicle risk score in response to the one or more vehicle risk score factors indicating an increased risk or a decreased risk, respectively. For example, if the vehicle risk related information collected in blocks 504-506 indicate an increased risk, the vehicle risk score updating logic 306 will increase the vehicle risk score. In some embodiments, if the vehicle risk related information collected in blocks 504-506 indicate no risk or a low risk, such as the operator of the vehicle 108 has received all vaccinations, the vehicle risk score updating logic 306 will decrease the vehicle risk score. Similarly, the vehicle risk score updating logic 306 may cause the remote computing device 102 to increase or decrease the vehicle risk score based on the user risk score of passengers previously driven by the vehicle 108, if provided, as determined in block 508. The vehicle risk score updating logic 306 will also increase or decrease the vehicle risk score based on whether or not the vehicle 108 has entered a geographic area determined to be a high-risk area, as well as increase the vehicle risk score proportional to the length of time that the vehicle 108 is within the particular geographic area, as determined in blocks 510-514. Additionally, the vehicle risk score updating logic 306 may cause the remote computing device 102 to decrease the vehicle risk score based on whether a cleaning event has occurred, as determined in block 516. Particularly, the vehicle risk score may be decreased proportional to an elapsed time since the last cleaning event occurred. Stated another way, the occurrence of a cleaning event has a reduced effect on the vehicle risk score as the elapsed time since the last cleaning event increases. Once the vehicle risk score is adjusted at block 518, the adjusted vehicle risk score is stored within the vehicle database 302. Blocks 504-516 may repeat at any given time to update the vehicle risk score based on updated information collected from the vehicle 108.

Figure 6:
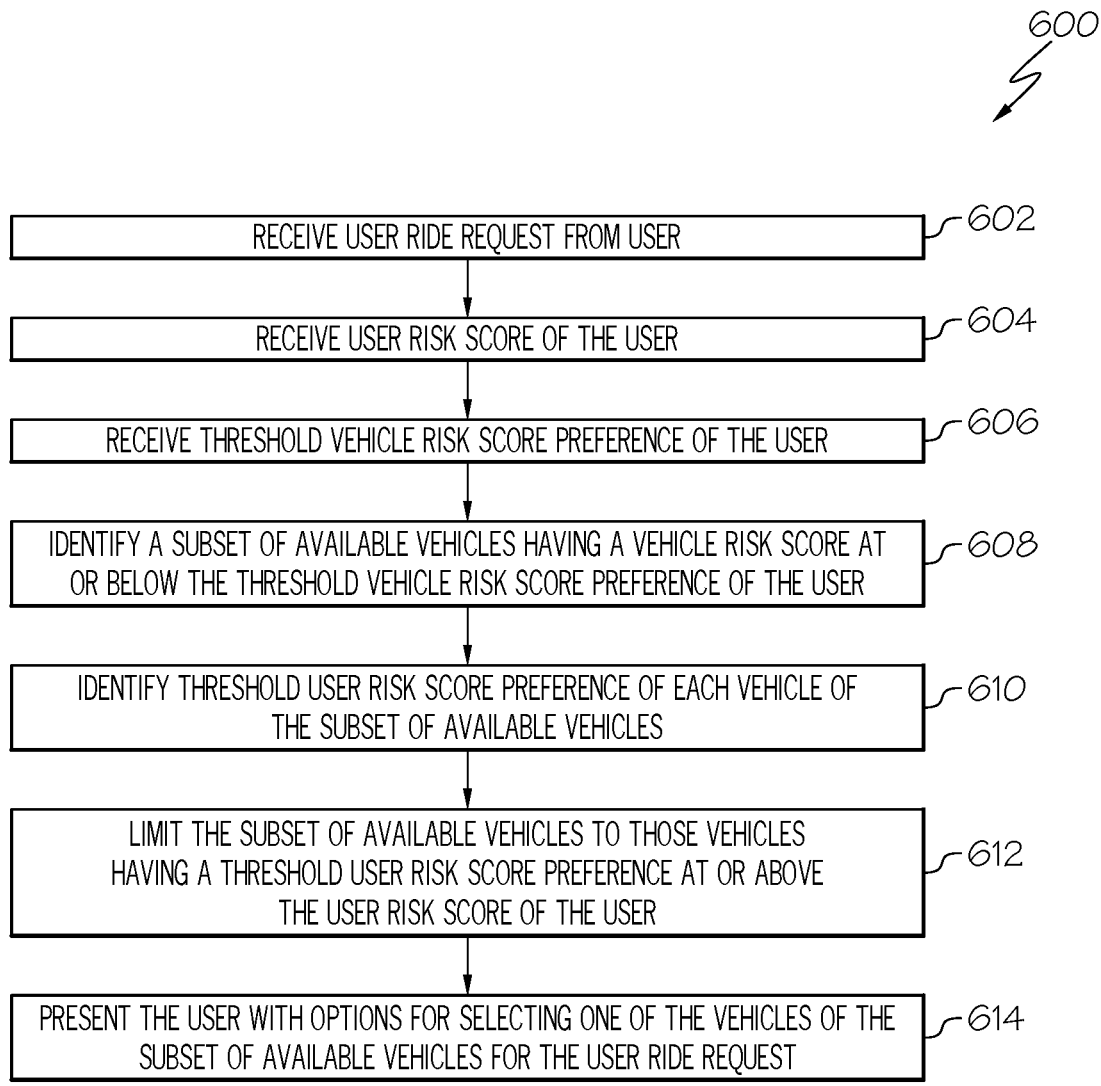
FIG. 6 schematically depicts a method for matching a vehicle with a user, according to one or more embodiments shown and described herein.

Referring now to FIG. 6, a process 600 is depicted for matching users with vehicles based on the user risk score and the threshold vehicle risk score preference assigned to each user, as well as the vehicle risk score and the threshold user risk score preference assigned to each vehicle. Accordingly, the vehicle matching system 100 matches each user to a particular vehicle such that the vehicle satisfies the threshold vehicle risk score preference of the user, based on the vehicle risk score of the vehicle, and the user satisfies the threshold user risk score preference of the vehicle. The process 600 is discussed with reference FIGS. 1-5.

At block 602, the remote computing device 102 receives a user ride request from a user 106 via a user device 104. The user ride request includes a pickup location, which may be a current location of the user device 104 determined by the location sensor 232 of the user device 104, and a drop off location or destination. The user ride request may include additional information such as, for example, a preferred vehicle, a number of passengers, and a pickup or drop off time.

Upon receiving the user ride request, the remote computing device 102 receives the user risk score assigned to the user 106 of the user device 104 at block 604. The user risk score is retrieved from the user database 300 of the remote computing device 102. As discussed above in the process 400, the user risk score of each user 106 is continually adjusted based on the one or more user risk score factors and the adjusted user risk score is stored in the user database 300 associated with the particular user 106.

In addition to receiving the user risk score of the user 106, the remote computing device 102 also receives the threshold vehicle risk score preference assigned to the user 106 at block 606. The threshold vehicle risk score preference is also retrieved from the user database 300 of the remote computing device 102. The threshold vehicle risk score preference indicates which vehicles may be matched to the user. Particularly, those vehicles 108 having a vehicle risk score above the threshold vehicle risk score preference will not be matched to the user. It should be appreciated that the threshold vehicle risk score preference may be initially set and adjusted by the user via the user device or any other device in communication with the server.

Prior to matching a vehicle 108 to the user 106 sending the user ride request, the remote computing device 102 identifies which of the vehicles 108 registered with the remote computing device 102 are available. As used herein, the term "available" refers to those vehicles 108 that may be selected to be matched to a user 106. These available vehicles 108 may be, for example, vehicles 108 that are not currently transporting any passengers or are in the process of dropping off current passengers such that the user 106 may be picked up by the requested pickup time. Thereafter, at block 608, the user/vehicle matching logic 308 of the remote computing device 102 identifies a subset of the available vehicles 108 that have a vehicle risk score at or below the threshold vehicle risk score preference of the user 106 sending the user ride request. As discussed herein with respect to process 500, the vehicle risk score of each vehicle 108 is continually adjusted based on the one or more vehicle risk score factors and the adjusted vehicle risk score is stored in the vehicle database 302 associated with the particular vehicle 108.

At block 610, the remote computing device 102 identifies a threshold user risk score preference of each vehicle 108 of the subset of available vehicles 108. As discussed herein, the threshold user risk score preference of each vehicle 108 is stored within the vehicle database 302 of the remote computing device 102. The remote computing device 102 limits the subset of available vehicles 108 to those vehicles 108 that are willing to accept the particular user 106 sending the user ride request. At block 612, the user/vehicle matching logic 308 may cause the remote computing device 102 to limit the subset of available vehicles 108 to those vehicles 108 that have a threshold user risk score preference at or above the user risk score of the user 106 sending the user ride request. Accordingly, the vehicles 108 within the subset of available vehicles 108 will each have a vehicle risk score at or below the threshold vehicle risk score preference of the user 106 sending the user ride request, and a threshold user risk score preference at or above the user risk score of the user 106 sending the user ride request.

After the subset of available vehicles 108 has been limited to those vehicles 108 satisfying the parameters discussed above, the user 106 is presented at block 614 with one or more ride options for selecting one of the vehicles 108 of the subset of available vehicles 108 for the user ride request. Particularly, the user 106 is presented with the ride options by displaying the ride options on the user interface 234 of the user device 104. It should be appreciated that, in embodiments, only one option for an available vehicle 108 may be presented to the user. However, when multiple ride options for available vehicles 108 are presented, the user 106 may select one of the vehicles 108 with which to be matched. In embodiments, the remote computing device 102 may organize the presentation of ride options for available vehicles 108 based on one or more characteristics. For example, the ride options of available vehicles 108 may be ranked based on vehicle risk score such that the user 106 can quickly ascertain which vehicles 108 have a lower or higher vehicle risk score. In embodiments, the ride options of available vehicles 108 may be ranked based on price. For example, certain ride options for available vehicles 108 may have a higher price if the user risk score of the user 106 is closer to the threshold user risk score preference for a particular vehicle 108. Accordingly, this may disincentivize a user 106 from selecting certain available vehicles 108. Once the user 106 selects one of the presented ride options, the user/vehicle matching logic 308 of the remote computing device 102 will assign the selected vehicle 108 to the user ride request and send instructions to the selected vehicle 108 to pickup the user 106.

From the above, it is to be appreciated that defined herein is a vehicle matching system in which a user sending a user ride request is matched to an available vehicle that has a vehicle risk score at or below a threshold vehicle risk score preference of the requesting user. In addition, the user may be matched to a vehicle that has a threshold user risk score preference at or above the user risk score of the requesting vehicle. This ensures that users are matched to a vehicle in which the user feels comfortable riding and, in addition, the operator of the matched vehicle feels comfortable transporting the requesting user.

While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method for matching a vehicle with a user, comprising:

receiving, by a computing device, a user ride request for a vehicle of a plurality of available vehicles from a user;

receiving, by the computing device, a threshold vehicle risk score preference associated with the user;

determining, by the computing device, a user risk score associated with the user;

determining, by the computing device, a vehicle risk score associated with at least one of the plurality of available vehicles;

receiving, by the computing device, a threshold user risk score preference associated with each of the plurality of available vehicles;

identifying, by the computing device, one or more vehicles within a subset of the plurality of available vehicles having an associated vehicle risk score at or below the threshold vehicle risk score preference associated with the user and an associated threshold user risk score preference at or above the user risk score associated with the user;

presenting the user with one or more ride options for selecting one of the one or more vehicles of the subset of the plurality of available vehicles for the user ride request; and receiving a selection by the user from the user device of the one of the one or more vehicles.

2. The method of claim 1, further comprising adjusting the vehicle risk score associated with a vehicle of the plurality of available vehicles based on one or more vehicle risk score factors.

3. The method of claim 2, wherein the one or more vehicle risk score factors include a location of the vehicle of the plurality of available vehicles within a geographic region determined to be a high-risk area, and a duration in which the vehicle of the plurality of available vehicles is within the geographic region.

4. The method of claim 2, wherein the one or more vehicle risk score factors include one or more of an elapsed time and a distance traveled since an occurrence of a cleaning event in the vehicle of the plurality of available vehicles.

5. The method of claim 4, further comprising detecting the occurrence of the cleaning event in response to detecting a triggering event from a cleaning device in the vehicle of the plurality of available vehicles.

6. The method of claim 2, wherein the one or more vehicle risk score factors include a number of previous passengers of the vehicle of the plurality of available vehicles and an associated user risk score of the previous passengers.

7. The method of claim 1, further comprising adjusting the user risk score associate with the user based on one or more user risk score factors.

8. The method of claim 7, wherein the one or more user risk score factors include a location of the user within a geographic region determined to be a high-risk area, and a duration in which the user is within the geographic region.

9. The method of claim 7, wherein the one or more user risk score factors include health data collected from the user.

10. The method of claim 1, wherein the one or more ride options presented to the user are assigned prices corresponding to the vehicle risk score associated with the vehicles of the subset of the plurality of available vehicles.

11. A vehicle matching system comprising:
a computing device comprising a controller configured to:
receive a user ride request associated with a vehicle from a plurality of available vehicles from a user;
receive a threshold vehicle risk score preference associated with the user;
determine a user risk score associated with the user;
determine a vehicle risk score associated with the plurality of available vehicles;
receive a threshold user risk score preference associated with the plurality of available vehicles;
identify one or more vehicles within a subset of the plurality of available vehicles having an associated vehicle risk score at or below the threshold vehicle risk score preference associated with the user and an associated threshold user risk score preference at or above the user risk score associated with the user;
present the user with one or more ride options for selecting one of the one or more vehicles of the subset of the plurality of available vehicles for the user ride request; and
receive a selection by the user from the user device of the one of the one or more vehicles.

12. The vehicle matching system of claim 11, wherein the server further comprises:
a user database including user data for a plurality of users, the user data including the user risk score and the threshold user risk score preference associated with the plurality of users; and
a vehicle database including vehicle data associated with the plurality of available vehicles, the vehicle database including the vehicle risk score and the threshold vehicle risk score preference associated with the plurality of available vehicles.

13. The vehicle matching system of claim 12, wherein:
the server receives the user data from a user device of the user; and
the server receives the vehicle data from the plurality of available vehicles.

14. The vehicle matching system of claim 13, wherein the vehicle risk score associated with a vehicle of the plurality of available vehicles is adjusted based on one or more vehicle risk score factors.

15. The vehicle matching system of claim 14, wherein the one or more vehicle risk score factors include a location of the vehicle of the plurality of available vehicles within a geographic region determined to be a high-risk area, and a duration in which the vehicle of the plurality of available vehicles is within the geographic region.

16. The vehicle matching system of claim 14, wherein the one or more vehicle risk score factors include an elapsed time or distance traveled since an occurrence of a cleaning event in the vehicle of the plurality of available vehicles.

17. The vehicle matching system of claim 14, wherein the one or more vehicle risk score factors include a number of previous passengers of the vehicle of the plurality of available vehicles and an associated user risk score of the previous passengers.

18. The vehicle matching system of claim 13, wherein the user risk score associated with the user is adjusted based on one or more user risk score factors.

19. The vehicle matching system of claim 18, wherein the one or more user risk score factors include a location of the user within a geographic region determined to be a high-risk area, and a duration in which the user is within the geographic region.

20. A vehicle matching system comprising:
a computing device comprising a controller configured to:
receive a user ride request for a vehicle from a plurality of available vehicles from a user;
identify one or more vehicles within a subset of the plurality of available vehicles having an associated vehicle risk score at or below a threshold vehicle risk score preference associated with the user and an associated threshold user risk score preference at or above a user risk score associated with the user;
present the user with one or more ride options for selecting one of the one or more vehicles of the subset of the plurality of available vehicles for the user ride request; and
receive a selection by the user from the user device of the one of the one or more vehicles.

* * * * *